June 21, 1960  J. H. GRAHAME  2,941,877
HYDROCARBON CONVERSION PROCESS
Filed July 1, 1957  3 Sheets-Sheet 1

June 21, 1960  J. H. GRAHAME  2,941,877
HYDROCARBON CONVERSION PROCESS
Filed July 1, 1957  3 Sheets-Sheet 2

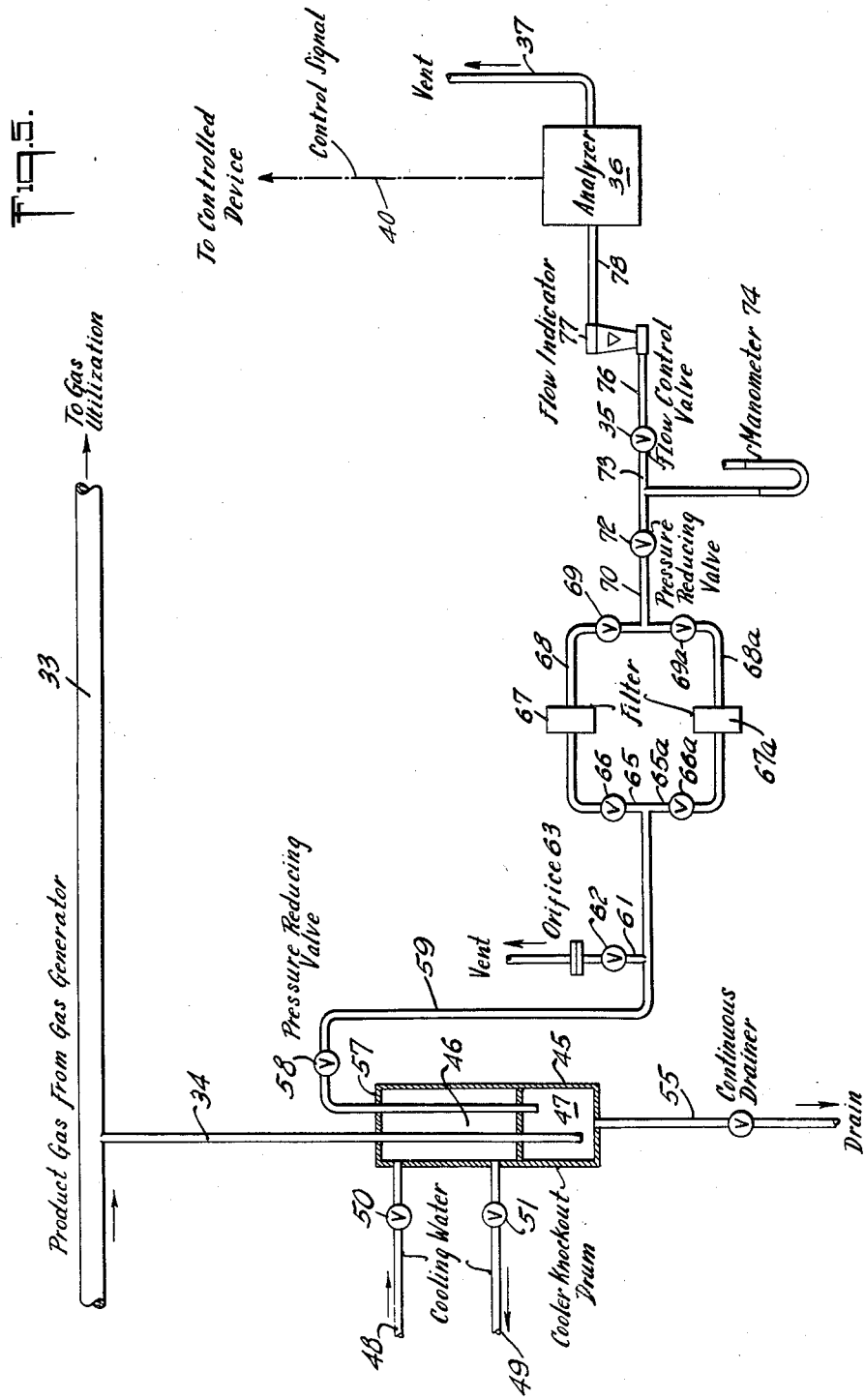

United States Patent Office 2,941,877
Patented June 21, 1960

2,941,877

HYDROCARBON CONVERSION PROCESS

James H. Grahame, Mount Vernon, N.Y., assignor to Texaco Development Corporation, New York, N.Y., a corporation of Delaware Filed July 1, 1957, Ser. No. 669,296

6 Claims. (Cl. 48—196)

This invention relates to a method and apparatus for the conversion of hydrocarbons and carbonaceous fuels to a gas comprising carbon monoxide and hydrogen. In one of its more specific aspects, it is directed to a method of controlling a gas generation process in which a hydrocarbon or carbonaceous fuel is reacted with an oxygen-containing gas under conditions of partial oxidation to produce a gas comprising carbon monoxide and hydrogen wherein a portion of said gas generator effluent is analyzed for a selected constituent and a process variable is controlled in response to a control signal varied according to the aforesaid analysis.

The generation of a gas by the partial oxidation of hydrocarbon or carbonaceous fuels to produce a gas comprising carbon monoxide and hydrogen, commonly referred to as synthesis gas, is well known. In the partial oxidation reactions, the fuel is reacted with a limited amount of oxygen under carefully controlled conditions to produce primarily carbon monoxide and hydrogen. Water in the form of steam, an endothermic reactant, may be added with the feed effecting an increase in the production of hydrogen. Alternatively or in addition to steam, carbon dioxide, another endothermic reactant, may be included in the feed and thereby increase the production of carbon monoxide. The products of partial oxidation consist principally of carbon monoxide and hydrogen accompanied by variable amounts of carbon dioxide and water vapor, and additionally, other gases in small quantities, for example, methane, hydrogen sulfide, carbonyl sulfide, nitrogen and argon, and in some cases, small quantities of free carbon. The relative quantity of carbon monoxide and hydrogen appearing in the gas generator product varies considerably depending upon, among other things, the relative carbon and hydrogen content of the feed stock and the use of extraneous steam or carbon dioxide. Although carbon monoxide and hydrogen are the primary products, it has not been found practical or feasible to control the operation of the synthesis gas generator by reference to either of these components. Similarly although water vapor and carbon dioxide are present in measurable quantities, the production of either of these constituents is not related to optimum conditions of operation in a manner to permit control of the synthesis gas generation operation. The carbonyl sulfide and hydrogen sulfide present in the gas generator effluent are derived from the sulfur contained in the feed stock and the nitrogen and argon present in the gas generator effluent are derived from impurities present in the oxygen, all of which are unrelated to the optimum operating conditions of the synthesis gas generator. However, unexpectedly, the methane content of the synthesis gas generator effluent may be related to optimum gas generating conditions whether employing gaseous, liquid or solid fuels. Although methane is not a component of the feed when employing liquid or solid fuels, it is produced, apparently by reforming reactions, and appears in the product gas.

Steam may be included with the feed to the gas generation zone to assist in control of reaction temperature, to produce additional amounts of hydrogen, and in the case of solid fuels, steam may be present as the transport medium for the introduction of the solid fuel into the gas generation zone. In some applications of synthesis gas generation, carbon dioxide may be available for inclusion in the synthesis gas generator feed. In such case, the carbon dioxide alters the ratio of carbon to hydrogen with resultant increase in the production of carbon monoxide. Carbon dioxide may be introduced with the feed to the gas generation zone either individually or in conjunction with steam to assist in the control of reaction temperatures. For successful operation of a gas generator for the production of carbon monoxide and hydrogen, the temperature throughout the generator must be maintained above about 1800° F. The temperature may be as high as 3500° F. although generally it is undesirable to maintain the temperature at this level because most refractory lining materials rapidly deteriorate at such high temperatures. An operating temperature within the range of about 2,000° F. to about 2800° F. is preferred.

The pressure may range from atmospheric to about 500 pounds per square inch gauge or higher. For the generation of hydrocarbon synthesis feed gas or ammonia synthesis gas, the pressure preferably is within the range of about 10 to 500 pounds per square inch gauge.

The proportion of oxygen passed to the reaction zone relative to hydrocarbons is maintained within a range such that the temperature is maintained below the maximum allowable and such that free carbon is produced in only limited quantities. When employing gaseous fuels, the free carbon produced is usually not in excess of about 0.1 weight percent of the carbon in the feed. Liquid and solid fuels may produce greater amounts of carbon, for example, as much as about 4 weight percent for liquid fuels and 10 weight percent for solid fuels but it is preferred to limit carbon production to about 2 weight percent for liquid fuels and 5 weight percent for solid fuels. The reaction of hydrocarbons to form carbon monoxide and hydrogen is supported without addition of heat to the reaction zone from external sources except that as sensible heat of the entering reactants.

The product gas is substantially free from uncombined oxygen containing not more than about 5 parts per million of uncombined oxygen. The relative proportion of carbon monoxide and hydrogen in the product gas varies with the relative proportions of carbon to hydrogen of the fuel. The product gas from fuels rich in hydrogen comprises about one mol of carbon monoxide to two mols of hydrogen while the product gas from hydrogen deficient fuels, for example, coal or coke, comprises more than one mol of carbon monoxide per mol of hydrogen. Independently of the type fuel employed, the relative proportions of hydrogen and carbon monoxide in the product may be varied by introducing additional hydrogen into the reaction zone in the form of water or steam or by introducing additional carbon in the form of carbon dioxide. Steam or carbon dioxide may be employed for one or more of many reasons, for example, to assist in control of the reaction temperature, as transfer medium to introduce solid fuel into the gas generation zone, as dispersion medium distributing the oil as fine droplets to improve combustion efficiency, or to increase the production of hydrogen or carbon monoxide. The relative proportion of steam to fuel may vary over a wide range, for example, from none at all to about 3 pounds of steam per pound of fuel supplied to the reaction zone. The temperature in the reaction zone may be regulated within desired limits by regulating the relative proportions of oxygen, and fuel supplied to the reaction zone or by regulating the proportions of steam or carbon dioxide if used. Since the reaction of steam or carbon dioxide with the fuel is endothermic, increasing the proportion of either tends to lower the reaction temperature. The reaction of oxygen with carbon or hydrogen is highly exothermic particularly at elevated pressures and steam or carbon dioxide may be employed to balance the exothermic reactions with endothermic reactions to prevent excessive reaction temperatures.

When operating to produce ammonia synthesis gas, conditions are selected such that the methane content of the product gas does not exceed about 4 or 5 mol percent and preferably is within the range of about 0.1 to about 0.6 mol percent. When producing high B.t.u. gas or heating gas, a high methane content is desirable and conditions may be selected to generate a product gas comprising as much as about 15 mol percent methane.

Having set forth its general nature, the invention will be best understood from the more detailed description hereinafter which refers to the accompanying drawings wherein:

Figure 5 is a detailed schematic diagram of a sampling system adapted for use in the process of this invention.

Figure 1:
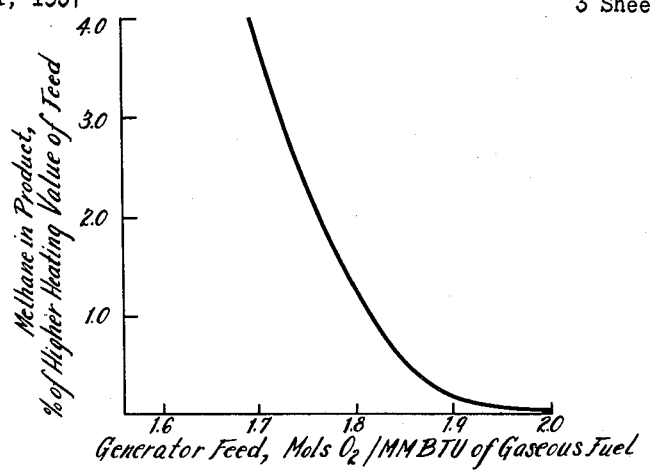
Figure 1 shows the relationship of methane content of the product gas to the oxygen to fuel ratio in the partial oxidation of gaseous fuels in accordance with the process of this invention.
Figure 2:
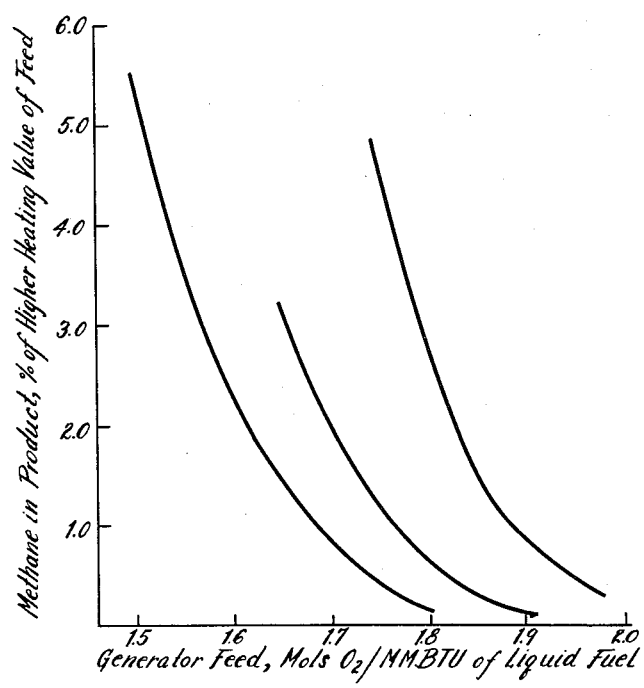
Figure 2 shows the relationship of methane content of the product gas to the oxygen to fuel ratio in the partial oxidation of liquid fuels in accordance with the process of this invention.
Figure 3:
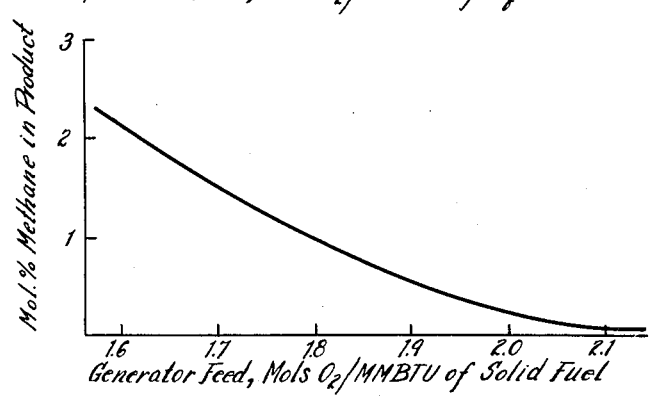
Figure 3 shows the relationship of methane content of the product gas to the oxygen to fuel ratio in the partial oxidation of solid fuels in accordance with the process of this invention.

In gas generation by partial oxidation, the methane content of the product gas has been found to be a function of the oxygen to fuel ratio. Figures 1, 2 and 3 show the relationship of methane content of the product to the oxygen to fuel ratio for gaseous, liquid and solid fuels respectively. Inspection of Figures 1, 2 and 3 shows that as the oxygen to fuel ratio is increased the methane content of the product gas is rapidly reduced. Figure 2 also shows the effect of increasing steam in the feed to a synthesis gas generator employing steam in the feed to a synthesis gas generator employing liquid hydrocarbon fuels. It will be noted that at constant oxygen to fuel ratio the addition of steam increases the methane content of the product gas, so that at a constant methane content, oxygen to fuel ratio must be increased with increased steam in the feed. Decreasing the oxygen to fuel ratio has been found to tend to reduce conversion, lower reactor temperature and produce noticeable amounts of methane. Increasing the oxygen to fuel ratio tends to reduce the amount of methane in the product gas but tends to result in increased reaction temperature. It has been found that it is not feasible to produce product gas having less than about 0.05 mol percent methane because of the high temperatures encountered at the high oxygen to fuel ratios necessary.

It has been found that the methane content of the effluent gas is a highly satisfactory criterion to control the operation of a partial oxidation gas generator in the range of conditions between conditions of high carbon production at low ratios of oxygen to fuel, and conditions of high temperature encountered at high ratios of oxygen to fuel. In accordance with one embodiment of the process of this invention effluent gas from a gas generator is continuously analyzed by means of an infrared analytical apparatus to determine the methane content of said gas. In analysis by infrared spectroscopy, infrared energy is passed through a sample and the transmitted energy is impinged upon a detector operative to generate a signal which varies according to the infrared absorbence of the sample. Analytical equipment suitable for the continuous analysis of gas streams is commercially available. The method of sensitizing such apparatus to determine variations in the concentration of a single component of a multicomponent gas mixture is well known. In accordance with one embodiment of this invention, an infrared analyzer is adapted to generate a signal proportional to the methane content of the gas analyzed. The signal thus generated is employed to actuate control devices operative to change process conditions as necessary to produce a product gas of predetermined methane content. For example, the aforesaid control devices may operate to adjust the oxygen to fuel ratio by adjusting the rate of either the oxygen or fuel fed to the gas generation reactor or both. Alternatively, the synthesis gas generation conditions may be adjusted by increasing or decreasing the relative amount of steam passed to the gas generation zone responsive to the aforesaid control devices when steam is employed with the feed or by increasing or decreasing the amount of carbon dioxide passed to the gas generation zone responsive to the aforesaid control devices when carbon dioxide is employed with the feed. Advantageously, either the oxygen or fuel flow is controlled by a flow rate controller set to hold a predetermined flow rate, the rate of the other being controlled by a flow rate ratio controller, and the flow rate ratio controller is reset responsive to the signal generated by the methane analyzer.

A maximum methane content of the product gas from the generator may be selected to prevent the production of excessive carbon, to prevent waste of fuel or to limit the amount of methane in the gas to accommodate the requirements of the intended use. A minimum methane content of the product may be selected to limit the gas generation temperature or to prevent uneconomic utilization of oxygen.

In one embodiment of this invention, the effluent gas from a gas generation process is analyzed for a plurality of individual constitutents and a plurality of operating variables are varied in response to the analysis of the respective constituents. For example, in a gas generator in which oil, steam, and oxygen are reacted to produce synthesis gas, the synthesis gas is continuously analyzed to determine the methane content, the hydrogen content and the carbon monoxide content. A control signal is generated responsive to the methane content and a second control signal is generated responsive to the ratio of the hydrogen content to the carbon monoxide content of the synthesis gas. The control of the operation of the generator is effected by maintaining a predetermined rate of oil feed controlled by a rate of flow controller. The rate of flow of the oxygen is controlled by a ratio flow controller to maintain a ratio of oxygen to oil flow as set by the controller and the aforesaid ratio flow controller is reset responsive to the methane analysis. The steam rate is controlled independently of the flows of oxygen and oil by a rate of flow controller reset responsive to the ratio of hydrogen to carbon monoxide in the synthesis gas. Obviously the amount of carbon dioxide recycled could be controlled responsive to the ratio of hydrogen to carbon monoxide in a manner similar to that described above for steam in cases where carbon dioxide recycle is employed.

Figure 4:
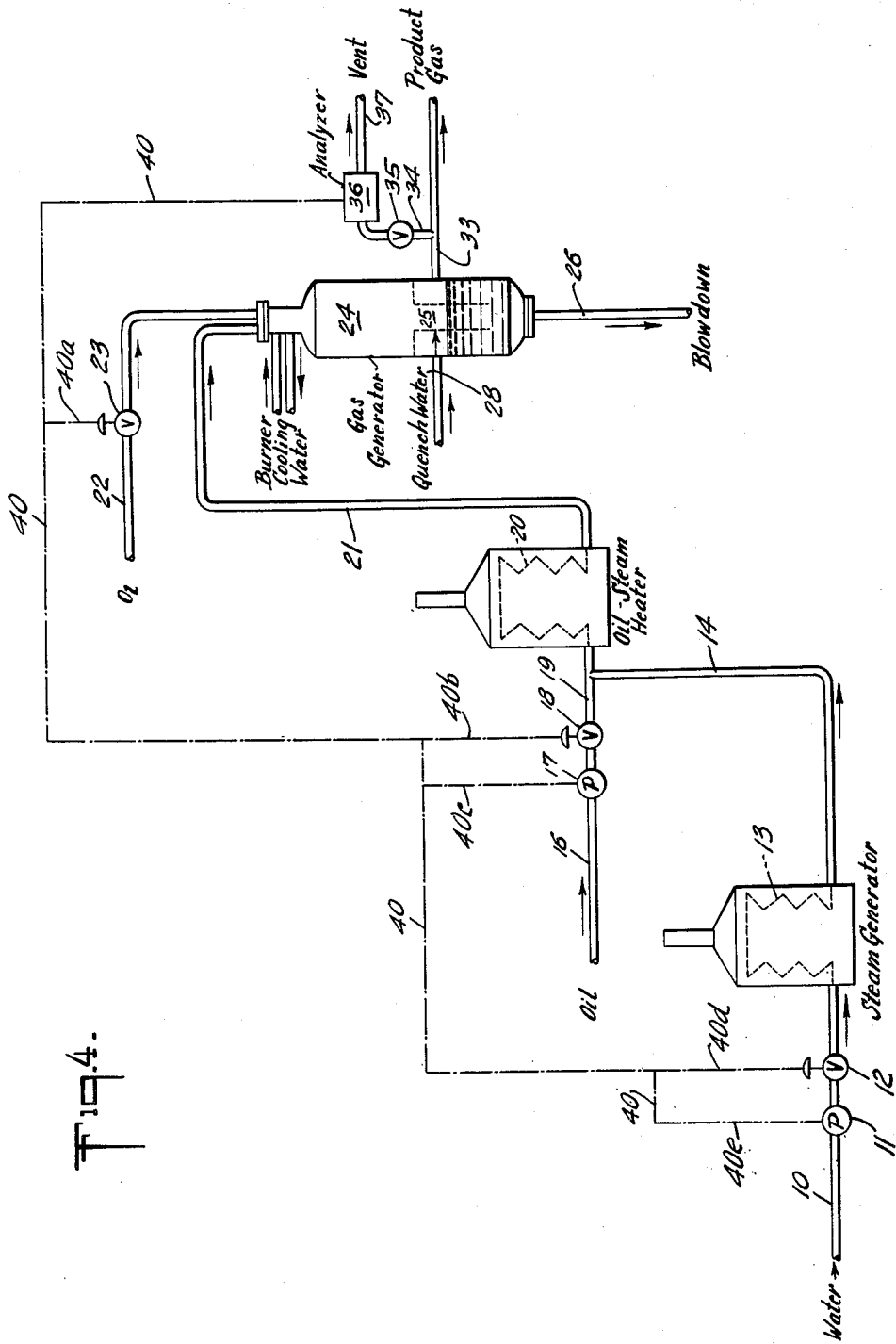
Figure 4 shows a schematic diagram of a preferred embodiment of this invention.

The accompanying drawing Figure 4 diagrammatically illustrates one arrangement of gas generation apparatus and controls suitable for carrying out the process of this invention. Although the drawing illustrates one arrangement of apparatus in which the process of this invention may be practiced it is not intended to limit the invention to the particular apparatus or materials described.

Steam is generated by passing water through line 10 by means of pump 11. The rate of flow through line 10 may be controlled by varying the speed of pump 11 or alternatively by throttling the stream of water by control valve 12. Water passes to steam generator 13 where it is vaporized and discharged as steam through line 14. Oil feed in line 16 is introduced into the charge system by pump 17. Flow rate of the oil may be controlled by varying the speed of pump 17 or alternatively by throttling the oil stream through control valve 18. Oil, at a controlled rate, is discharged through line 19. Steam in line 14 and oil in line 19 are combined and passed through oil-steam heater 20 where the mixture of oil and steam is preheated to a temperature of about 750° F. Oxygen in line 22 at a rate controlled by throttle valve 23 is passed to gas generator 24.

The oil, steam and oxygen react in gas generator 24 to produce a gas consisting essentially of carbon monoxide and hydrogen with lesser quantities of other gases including methane. The reaction is quenched by means of water introduced through line 28 into quench zone 25 in the lower portion of gas generator 24. The solids, if any, are removed by withdrawing a blowdown stream as necessary through line 26 and discharging to suitable disposal facilities.

Effluent gases from gas generator 24 pass through line 33. A small portion of the generator effluent is withdrawn through line 34 and valve 35 to methane analyzer 36 and vented through line 37. Analyzer 36 continuously analyzes the stream of gas passing therethrough for one or more constituents, for example methane, hydrogen, carbon monoxide and so forth, and generates a control signal or signals responsive to said analyses. The control signal is transmitted by control circuit 40 and 40a to adjust the oxygen to fuel ratio by controlling the rate of flow of oxygen in line 22 by actuating valve 23. Obviously when a plurality of operating variables are controlled responsive to a plurality of analyses, separate control circuits (not shown) are required for each variable independently controlled. Alternatively, the oxygen to fuel ratio may be adjusted by controlling the flow of oil by impressing the control signal on control valve 18 through control circuits 40 and 40b or by impressing the control signal on the oil pump motor speed control through control circuits 40 and 40c. Alternatively, other operating conditions may be adjusted, for example, the steam rate may be controlled by adjusting the water feed rate by impressing the control signal on valve 12 through control circuits 40 and 40d or by impressing the control signal on the water pump motor speed control through control circuits 40 and 40e.

A sampling arrangement suitable for use in accordance with one embodiment of this invention is shown in Figure 5. A small portion of the gas generator effluent flowing in line 33 is withdrawn through line 34 and is discharged into cooler-knockout drum 45. Cooler-knockout drum 45 comprises a vessel partitioned to separate it into a cooling section 46 and knockout section 47. Cooling water is circulated through the cooling section of vessel 45 through lines 48 and 49 and valves 50 and 51. Line 34 passes through cooling section 46 as a straight pipe which discharges into knockout section 47. The use of a straight tube through the cooling zone effectively avoids the formation of plugs of free carbon and condensate. Condensate and free carbon collecting in the bottom of knockout section 47 are withdrawn through line 55 by continuous drainer or trap 56 and discharged to the drain. Gases from the top of knockout section 47 pass through line 57 which passes as a straight pipe through cooling section 46. Any additional condensate forming in line 57 falls back into knockout section 47.

The gas stream to this point is substantially at the pressure prevailing in line 33 which in turn is at the pressure of the gas generator, for example, up to about 500 pounds per square inch gauge. Gas in line 57 is then passed through a pressure reducing valve 58 effecting expansion to a lower pressure, for example, up to about 200 pounds per square inch gauge and discharged into line 59. After expansion, further atmospheric cooling will not result in further condensation of water vapor. In order to insure rapid response of the sample system to changes in the stream being sampled, the preceding apparatus is continuously flushed by withdrawing a bleed stream through line 61, valve 62, and orifice 63 to a vent. Orifice 63 maintains a continuous and uniform flow without any attention.

Any remaining free carbon in the sample stream is removed by passing the gas stream through line 65, valve 66 and filter 67. Filtered gas is passed through line 68 and valve 69 to line 70. Filter 67 may comprise a sintered metal filter or other filter media, for example, glass wool, asbestos fiber, etc. A parallel filter train comprising lines 65a and 68a, valves 66a and 69a and filter 67a is employed so that one train may be shut down for cleaning while the other is in use. Gas in line 70 is reduced to a suitable pressure for instrument use, for example, a pressure within the range of about 5 to 15 inches of water, by pressure reducing valve 72 discharging into line 73. Pressure in line 73 is indicated by manometer 74. The flow of gas to the analyzer 36 through lines 76 and 78 is controlled by valve 35 at a suitable rate as indicated by flow indicator 77. As described hereinbefore, analyzer 36 analyzes the gas stream passed therethrough for a component of said gas stream, for example methane, and generates a control signal which is transmitted as indicated by broken line 40 to a device effective to alter an operating condition in response to said signal. Gas passed through analyzer 36 is vented through line 37.

The process of this invention may be applied to diverse fuels including gaseous, liquid and solid hydrocarbons and carbonaceous fuels, for example, coal and coke, all of which are to be included within the term "carbonaceous fuels" used in the appended claims.

Obviously, many modifications and variations of the invention as hereinbefore set forth may be made without departing from the spirit and scope thereof and only such limitations should be imposed as are indicated in the appended claims.

I claim:

1. A method of controlling a gas generation process in which a carbonaceous fuel is reacted with an oxygen-containing gas by partial oxidation at an autogenous temperature within the range of 1800 to 3500° F. producing a synthesis gas consisting essentially of carbon monoxide and hydrogen which comprises analyzing at least a portion of the gas generator effluent for methane, generating a signal proportional to said methane content of said gas generator effluent, and controlling the oxygen to fuel ratio of said gas generation process in response to said signal.

2. The process of claim 1 wherein said gas generator effluent is analyzed by passing infrared energy therethrough and impinging transmitted infrared energy on a detector operative to generate a signal proportional to the relative amount of methane in said gas generator effluent.

3. A method of controlling a gas generation process in which a carbonaceous fuel is reacted with an oxygen-containing gas in a gas generation zone by partial oxidation at an autogenous temperature within the range of 1800 to 3500° F. producing a synthesis gas consisting essentially of carbon monoxide and hydrogen which comprises continuously withdrawing a portion of the effluent synthesis gas from said gas generation zone, cooling said gas to effect condensation of water, separately withdrawing water and a gas of reduced water content, expanding said gas of reduced water content to a pressure below that at which further condensation of water occurs at ambient atmospheric temperatures, separating free carbon from said gas of reduced water content, analyzing said gas of reduced water content from which free carbon has been separated for methane, generating a signal proportional to said analysis, and controlling the oxygen to fuel ratio of said process in response to said signal.

4. The process of claim 3 wherein said gas generator effluent is analyzed by passing infrared energy therethrough and impinging transmitted infrared energy on a detector operative to generate a signal proportional to the relative amount of methane in said gas generator effluent.

5. A method of controlling a gas generation process in which a carbonaceous fuel is reacted with an oxygen containing gas by partial oxidation at an autogenous temperature within the range of 1800 to 3500° F. producing a synthesis gas consisting essentially of carbon monoxide, hydrogen and methane, which comprises, analyzing at least a portion of the gas generator effluent for methane and controlling the oxygen to fuel ratio of said gas generation process responsive to said methane content maintaining the methane content of said synthesis gas within the range of 0.05 to 15 mol percent.

6. The process of claim 5 wherein the methane content of said synthesis gas is maintained within the range of about 0.1 to 0.6 mol percent.

References Cited in the file of this patent

UNITED STATES PATENTS

| | | |
|---|---|---|
| 1,644,123 | Griswold | Oct. 4, 1927 |
| 2,667,410 | Pierce | Jan. 26, 1954 |
| 2,702,238 | Hays | Feb. 15, 1955 |
| 2,711,419 | Milbourne et al. | June 21, 1955 |
| 2,773,349 | Bollo et al. | Dec. 11, 1956 |
| 2,813,138 | MacQueen | Nov. 12, 1957 |